United States Patent [19]
Casanave

[11] Patent Number: 4,873,769
[45] Date of Patent: Oct. 17, 1989

[54] CABINETRY INSTRUMENT

[76] Inventor: Anthony J. Casanave, P.O. Box 880, 3404 Waterview Rd., Toano, Va. 23168

[21] Appl. No.: 227,545

[22] Filed: Aug. 1, 1988

[51] Int. Cl.[4] .......................... G01B 3/00; F05D 11/00
[52] U.S. Cl. .......................................... 33/194; 33/667; 408/72 R
[58] Field of Search ................. 33/194, 197, 574, 578, 33/667, 668, 669, 666; 408/72 R, 72 B, 115 R, 115 B, 241 B

[56] References Cited

U.S. PATENT DOCUMENTS

| | | | |
|---|---|---|---|
| 1,224,302 | 5/1917 | Johnson | 33/197 |
| 1,400,898 | 12/1921 | Murdock | 33/197 |
| 1,612,068 | 12/1926 | Sherwin | 33/194 |
| 1,680,575 | 8/1928 | Starbuck | 33/197 |
| 2,239,576 | 4/1941 | Seiger | 33/197 |
| 2,637,910 | 5/1953 | Buttram | 33/197 |
| 2,647,325 | 8/1953 | Little | 33/667 |
| 2,887,776 | 5/1959 | Eisner . | |
| 3,203,104 | 8/1965 | Heathington | 33/667 |
| 3,324,907 | 6/1967 | Stepanek | 33/197 |
| 3,371,423 | 5/1968 | Paul | 33/666 |
| 4,058,902 | 11/1977 | Hall | 33/194 |
| 4,133,114 | 1/1979 | Roach . | |
| 4,501,308 | 2/1985 | Sherman . | |
| 4,586,262 | 8/1986 | Back . | |
| 4,686,769 | 8/1987 | Rock . | |

FOREIGN PATENT DOCUMENTS

| | | | |
|---|---|---|---|
| 514284 | 7/1955 | Canada | 33/197 |
| 959308 | 12/1974 | Canada | 408/115 R |
| 78599 | 6/1932 | Sweden | 33/197 |

*Primary Examiner*—William A. Cuchlinski, Jr.
*Assistant Examiner*—Thomas B. Will
*Attorney, Agent, or Firm*—Wallace J. Nelson

[57] ABSTRACT

An instrument for accurately measuring and positioning cabinet and furniture door hinges is disclosed. Instrument 10 includes an elongated measuring rod 13 having a measurement scale thereon and provided with one or more sleeve members 17,19 slidably and releasably positioned thereon via thumbscrew 18 at the measured distance for hinges to be applied to a cabinet door 12. An extension arm 35 of door contact member 15 rests on the rabbet of door 12 and templates 21,22 extending from sleeves 17,19 respectively, provide the bore pattern for drilling holes in door 12 for screw attachment of the hinges. Door contact member 15 is rotated 180°, via release and locking of spring urged pin 36, as shown in FIG. 3 to locate templates 21,22 in position to permit drilling through the end bores 33,34 therein into the cabinet housing for screw attachment of the hinge segment. Removable templates may be employed with different attachment pin embodiments provided therefor. The template may also be integrally formed with the sleeve members.

19 Claims, 2 Drawing Sheets

CABINETRY INSTRUMENT

FIELD OF THE INVENTION

This invention relates generally to cabinet and furniture making and relates in particularly to an instrument for precisely measuring and positioning hinges on cabinet and furniture doors and the process therefor that gives the cabinet or furniture maker the ability to repeat these precise measurements and hinge locations on multiple doors.

BACKGROUND OF THE INVENTION

The proper location of hinges on cabinet and furniture doors is essential when constructing kitchen cabinets and various furniture items, particularly where two doors are designed to close in faced adjacency. In order to ensure that adjacent doors hang even, or are at the same level, it is critical to duplicate the hinge location on these face-to-face or adjacent doors. Otherwise, the hinges on one of the doors may have to be mounted a second time to achieve the desired aesthetic effect. Additionally, when a series of kitchen cabinets, or the like, are being constructed it is not always an easy task to repeat precise hinge placement on all doors in the series or set.

SUMMARY OF THE INVENTION

It is, accordingly, an object of the present invention to provide an instrument for accurately measuring and positioning cabinet and furniture door hinges.

Another object of the present invention is to provide an instrument that permits accurate duplication of hinge locations on a plurality of identical cabinet and furniture doors.

A further object of the present invention is an instrument for measuring and positioning cabinet and furniture door hinges wherein a removable hinge template is employed to permit the use of different size and/or shaped hinge templates and applicable to face-frame or frameless cabinetry.

An additional object of the present invention is to provide an instrument having multiple hinge templates equal to the number of hinges to be secured to a cabinet or furniture door to simultaneously measure and mark the position of each hinge to be attached to the door.

Another object of the present invention is a novel process of accurately measuring and positioning multiple hinges on a single or plurality of cabinet or furniture doors.

According to the present invention, the foregoing and additional objects are attained by providing an instrument including an elongated measuring rod having a rectangular cross-sectional area and provided with a measurement scale thereon. At least one sleeve member is slidably disposed on the measuring rod and a suitable adjustable friction contact is provided between the slidable sleeve and the rod. In the preferred embodiment this adjustable friction contact is in the form of a thumbscrew threadingly extending through a first side of the slidable sleeve member. A hinge template is releasably connected to a second or opposite side of the sleeve via a mortise and tenon connection with a locking pin being also employed to extend transversely through the tenon and a portion of the slidable sleeve. A window is provided through the sleeve area disposed over the measuring scale with suitable indicia marks provided on the sleeve to match or align with the indicia markings on the measurement scale. In the preferred embodiment a pair of slidable sleeves are employed and adjustably fixed in spaced relationship along elongated measuring rod to the location or position that the hinges are to be placed on the cabinet or furniture door. A door contact member is transversely attached to an end of the elongated measuring rod to provide a rest or contact for the rod during measurement of the hinge locations and marking thereof through the sleeve attached templates. One, two, three or more sleeve attached templates may be employed as required or desired for a specific job.

BRIEF DESCRIPTION OF THE DRAWINGS

A more complete appreciation of the invention and many of the attendant advantages thereof will be more readily appreciated as the same becomes better understood by reference to the following detailed description when considered in connection with the accompanying drawings wherein.

DETAILED DESCRIPTION

Figure 1:
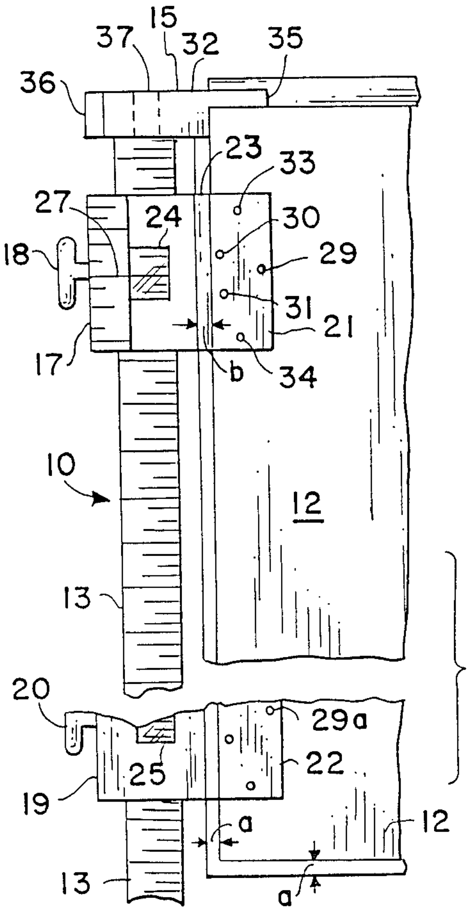
FIG. 1 is a broken view of the preferred embodiment of the hinge measurement and positioning instrument of the present invention positioned on the inside of a cabinet door that is to be hinged.

Referring now to the drawings and more particularly to FIG. 1, the instrument of the present invention is shown and designated generally by reference numeral 10. As shown therein, instrument 10 is positioned on the inside of a cabinet door 12 in position to permit measurement and drilling of the holes for attaching a pair of hinges thereto. Cabinet door 12 is provided with three-eights inch ($\frac{3}{8}''$) rabbet edges along the inside peripheral surface as indicated by the two pair of arrows designated by the reference a. Instrument 10 includes an elongated measuring rod 13 having a door contact member 15 transversely and rotatably attached to one end thereof. Elongated measuring rod 13 is provided with a measuring scale etched or otherwise permanently formed along at least one surface thereof. In the preferred embodiment, two slidable sleeve members are adjustably positioned along the length of rod 13 as designated by reference numerals 17,19. A pair of thumbscrews 18, 20 extend, one each, transversely through one edge of sleeve members 17, 19 for frictionally retaining each sleeve at a selected position along measuring rod 13. A pair of hinge templates 21,22 extend from the edge of respective sleeve members 17,19 opposite to the edge thereof receiving thumbscrews 18,20.

Slidable sleeves 17,19 are provided with respective windows 24,25 through the side thereof adjacent the measuring scale on measuring rod 13. Each window 24,25 is provided with a transparent, glass or plastic, cover or insert housing a cross-hair for alignment with the indicia formed on sliding sleeves 17,19. Only cross-hair 27 for window 24 is visible in FIG. 1. Cross-hair 27 and the one not shown are also permanently aligned with the respective center bores **29,29*a* formed in templates 21 and 22. Two other bores 30,31 formed in template 21 (and similar bores formed in template 22, one not shown and the other not designated) are in vertical alignment and form a triangular pattern with bore 29 (and 29*a*) identical to the hole pattern in the hinge to be attached to door 12**.

Another pair of vertically aligned bores 33,34 is formed adjacent opposite ends of template 21 and form a hole pattern identical to the holes in the hinge section to be attached to the cabinet body. Base 23 of template 21 forms a "T" with template 21 (see FIG. 4) and extends from slidable sleeve 17 a distance b, or three-eighths of an inch in the preferred embodiment illustrated.

As shown in FIG. 1, door contact 15 includes a main body portion 32, a reduced thickness extension arm 35 and an end segment 36. A spindle 37 integrally extends from elongated measuring rod 13 and rotatably supports door contact member 15.

Figure 2:
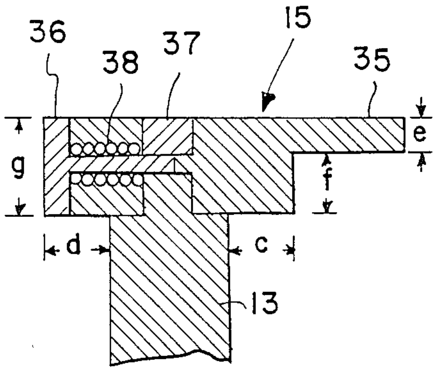
FIG. 2 is a sectional view of the door contact member on the instrument shown in FIG. 1.

Referring now more particularly to FIG. 2, end segment 36 of door contact 15 forms the head of a spring urged (via surrounding spring 38) pin that is received within a bore (not designated) extending transversely through spindle 37. Spindle 37 is an integral extension of measuring rod 13. Spring urged pin 36 prevents rotative and linear movement of door contact 15 relative to measuring rod 13 while engaged within the spindle bore. The reduced thickness arm 35 of door contact 15 rests on the rabbet edge of door 12 during the measurement and positioning of templates 17,19. Arm 35 has a thickness e equal to the desired spacing for the door rabbet from the top of the cabinet housing or body. In the preferred embodiment illustrated distance e is three-sixteenths of an inch. The remaining thickness of door contact 15 is labeled f and is equal to the difference between distance g (the height of door contact 15) and distance f. In the preferred embodiment, f is equal to one-half inch, the distance door 21 is designed to overlap the cabinet housing.

Figure 3:
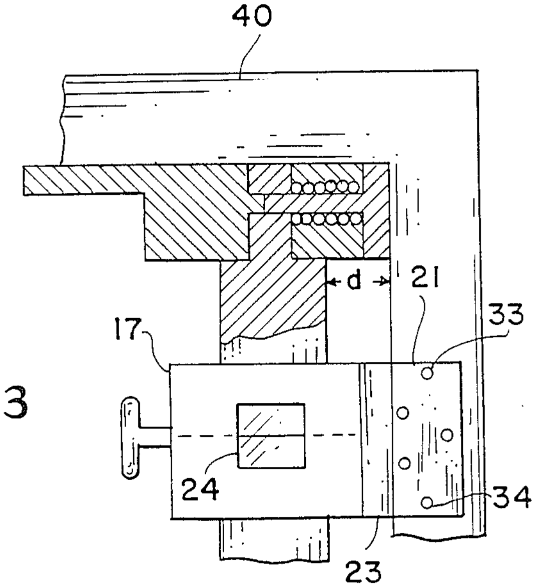
FIG. 3 is a part sectional view of the instrument shown in FIG. 1 with the door contact rotated 180° and disposed within a cabinet frame to be fitted with the door shown in FIG. 1.

Referring now more particularly to FIG. 3, door contact 15 is shown rotated 180° from the position illustrated in FIGS. 1 and 2. This rotation is accomplished by grasping the end of spring urged pin 36 and exerting a force thereon sufficient to overcome the force of spring 38 and remove the tip of pin 36 from spindle 37. Door contact 15 is then rotated 180° and pin 36 released to permit spring 38 to return the end of pin 36 into the transverse bore extending through spindle 37. In this position, instrument 10 may then be positioned, as shown in FIG. 3, on the inside of cabinet housing 40 to which door 12 is to be installed. Slidable sleeves 17 and 19 remain fastened via thumbscrew 18,20 in the same position as when the hinges for door 12 were measured and positioned.

With the instrument placed as shown in FIG. 3 the end of door contact member 15, formed by the head of spring urged pin 36, is positioned against the inside of cabinet housing 40. The arrows d indicate the distance this end of door contact member 15 extends from measuring rod 13 and this distance is equal to the distance from measuring rod 13 to the edge of base 23 of template 21 as indicated by arrows c (FIG. 2). In this position, with base 23 resting on the door rabbet, vertically aligned bores 33 and 34 are in the position desired to permit drilling the holes needed to attach the hinge to the cabinet housing, as will be further explained hereinafter.

Figure 4:
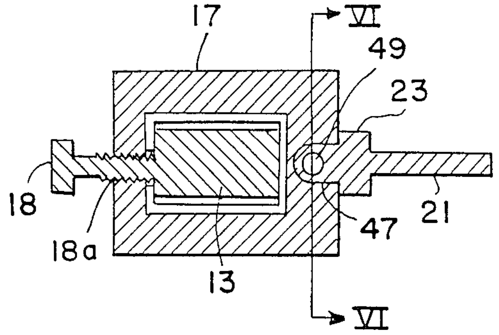
FIG. 4 is a sectional view of one slide sleeve disposed on the instrument and illustrating a removable hinge template and fastening structure for connecting the sleeve and removable hinge template to the instrument measuring rod.

Referring now to FIG. 4, a section of slidable sleeve 17 is shown illustrating the preferred embodiment for releasably attaching slidable sleeves 17 and 19 to measuring rod 13. During positioning of sleeve 17 along rod 13, thumbscrew 18 is loosely disposed within threaded bore **18*a* of sleeve 17 and out of contact with rod 13 to permit sleeve 17 to freely slide therealong. When sleeve 17 and attached template 21 are moved to the position desired, thumbscrew 18 is turned to threadingly force the thumbscrew end against the side of measuring rod 13 and thereby frictionally retain sleeve 17 and template 21 in position. The same procedure is followed for releasably locking sleeve 19 and template 22 in position on rod 13**.

Figure 6:
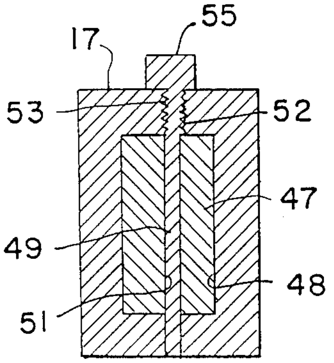
FIG. 6 is a sectional view taken along line VI-VI of FIG. 4 and illustrating the locking pin mechanism for retaining the removable template in connection with the slide sleeve.

As shown in FIGS. 4 and 6 (see also FIGS. 8 and 9), template 21 is provided with a tenon 47 extending from the opposite side of base 23 and along the same plane as template 21. Tenon 47 is received within mortise 48 (FIG. 6) provided in sleeve 17 and retained therein by a pin 49. A bore 51 is formed through tenon 47 to receive pin 49. Suitable colinear bores (not designated) are also formed in sleeve 17 to receive pin 49. The bore 52 formed in the portion of sleeve 17 facing door contact member 15 is provided with one or more threads that serve to engage matching threads 53 formed on pin 49. An integral knurled head 55 on pin 49 facilitates insertion and removal of pin 49 when template 21 is installed or removed for replacement with a different template. The threaded segment of pin 49 ensures that template 21 is retained in position during movement of rod 13.

Figure 5:
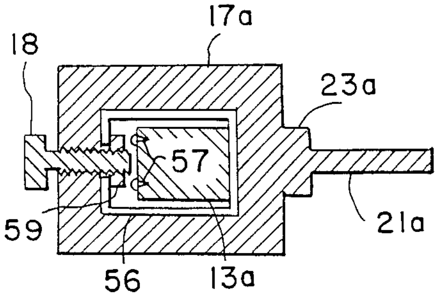
FIG. 5 is a view similar to FIG. 4 illustrating a modified fastening system for a slide sleeve and an integral hinge template.

Referring now to FIG. 5 a modified slidable sleeve, template and latching arrangement is illustrated. As shown therein, rod **13*a* is provided with a channel bar 56 attached thereto by a plurality of screws, two of which are shown and designated by reference numeral 57. Channel bar 56 extends the length of rod 13*a* and has an open rectangular cross-sectional area. Slidable sleeve 17*a* is positioned thereon by sliding rectangular nut 59 into the cavity formed by channel bar 56. Nut 59 is threaded onto and loosely attached to thumbscrew 18*a* which slidably extends through an edge of sleeve 17*a*. When sleeve 17*a* is positioned at the desired location along rod 13*a*, thumbscrew 18 is tightened into nut 59 to cause nut 59 to frictionally engage the surface of channel bar 56 and retain slidably sleeve 17*a* in position. A template 21*a* and a base 23*a* therefor are integrally formed with sleeve 17*a*. Thus, to change templates when employing this embodiment, the entire sleeve 17*a* is removed from rod 13*a* and replaced with a sleeve having the desired template formed thereon. Base 23*a* and template 21*a*** are of the same dimensions as in the previously described embodiments and operate in the same manner.

Figure 7:
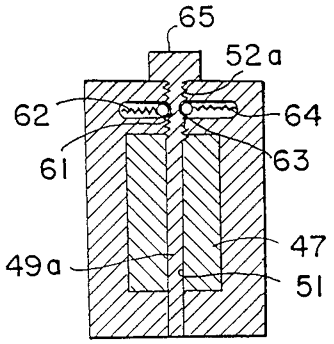
FIG. 7 is a view similar to FIG. 6 and illustrating an alternate locking pin arrangement for the removable template and sleeve connection.

Referring now to FIG. 7, an alternate embodiment for a locking pin employed to secure a removable template to a sleeve is illustrated. This embodiment is identical to that illustrated in FIG. 6 except for the locking pin retention mechanism. In this embodiment locking pin 49*a* is positioned through bore 51 in tenon 47 as previously described. Bore 52*a* in sleeve 17 contains at least one, or as illustrated, two bullet-type detents 61,63 that engage a circumferential groove (not designated) on pin 49*a* for retention of the pin within sleeve 17. Each detent 61,63 is provided with a ball or bullet-nose end and is spring urged via springs 62,64, respectively, toward the bore in sleeve 17 that receives pin 49*a*.

Pin 49*a* is provided with a knurled end 65 to facilitate insertion and removal thereof from sleeve 17 and tenon 47. When inserted, detents 61,63 are spring urged into engagement with the circumferential groove formed on pin 49*a* and serve to retain the pin in position to prevent accidental release of tongue 47 on template 21. Multiple spaced circumferential grooves may be formed on pin 49*a* and stacked bullet detents provided for the multiple grooves, as so desired. Also, one, two, or more bullet detents may be employed for each spaced circumferential groove.

Figure 8:
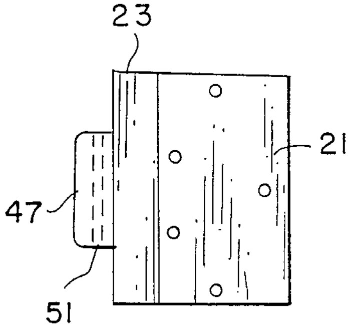
FIG. 8 is a view of the removable template employed in FIGS. 4 and 6; and, FIG. 9 is a view of a modified pattern hinge template that may also be employed in the removable template embodiment of the invention.
Figure 9:
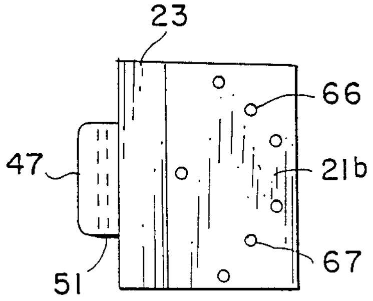

Referring now to FIGS. 8 and 9, two templates are shown having different bore patterns to correspond to specific hinge designs. Other templates having additional hinge bore designs may also be employed as required. The preferred embodiment of the present invention is template 21, illustrated in FIG. 8, and adapted for installing AMEROCK three-eights inch recess door hinges. By changing to template 21*b* (FIG. 9), a different hinge, such as the "32 mm" hinge may be installed by use of the present invention. In this embodiment holes 66 and 67 are disposed 32 mm from each other. Other hinge bore patterns would dictate different templates for use in installing full overlay or complete recess doors and the use thereof is considered within the scope of the present invention.

OPERATION

The operation of the invention is now believed apparent from the above detailed description. Instrument 10 is positioned initially on the inside of a ⅜" rabbet door and sleeve 17 moved along rod 13 to the predetermined measurement for the top door hinge. Cross-hair 27 is aligned with the predetermined measurement indicia on rod 13 and sleeve 17 and attached template 21 releasably secured in this position by tightening thumbscrew 18. Sleeve 19 and attached template 22 are similarly secured to the desired location to establish the position for the hinge on the bottom of door 12. While holding instrument 10 in the position indicated in FIG. 1, a hand drill having a 1/16 inch, or slightly larger, drill bit is inserted through template 21 into each of bores 29, 30 and 31 and holes drilled for installing the upper hinge to door 12. This procedure is repeated for bore 29*a* and the others, not shown, to drill holes through template 22 for installing the lower hinge on door 12. If three hinges are to be applied to door 12, the same procedure is followed for the third hinge.

After drilling the necessary holes in door 12 for the hinges, and while retaining the same sleeve/template settings, spring urged bolt 36 on door contact member 15 is grasped by the cabinet maker and sufficient force exerted thereon to overcome the force of spring 38 and remove bolt 36 from spindle 37. Door contact member 15 is then rotated 180°, relative to rod 13, and bolt 36 released to permit spring 38 to force bolt 36 into the opposite side of the transverse bore extending through spindle 37. Instrument 10 is then positioned as shown in FIG. 3 to place the bolt end 36 of door contact member 15 in abutting contact with the inside corner of cabinet housing or frame 40. In this position, base 23 of template 21 rests against the edge of the cabinet housing and template 21 is in position to permit drilling the holes necessary to install the hinge portion to be attached to the cabinet housing. Thus, while holding instrument 10 in the position shown in FIG. 3, the drill bit on the hand drill is inserted through bores 33,34 on template 21 and the other template (not shown in this FIG.) to drill the holes for the two screws employed to attach the hinge to the cabinet housing.

Although the invention has been described relative to specific embodiments thereof, it is not so limited and numerous variations and modifications thereof will be readily apparent to those skilled in the art in the light of the above teachings. For example, modifications to the sleeve fastening or locking mechanism shown in FIGS. 4 and 5 may be made and, when measuring rod 13 is formed by machining or extrusion, the channel for receiving nut 59 attached to thumbscrew 18*a* may be formed as an integral part of the measuring rod and of a dovetail or different shape than the rectangular shape shown for channel bar 56. Also, measurements and hinge positioning may be made with only one sleeve/-template when so desired.

Also, additional or less threaded area and additional or different detents, as well as other pin retaining mechanisms may be employed for that shown for pins 49,49*a* in FIGS. 6–7. No specific procedure or materials have been mentioned for constructing the component parts of the present invention. It is contemplated that the individual rod, sleeve and templates may be fabricated by machining, molding, or extrusion, or a combination of these procedures, from light weight metals, such as aluminum, steel or alloys of these metals, durable rigid plastics, and the like, or a combination of these materials. For example, all parts could be formed of hard vinyl and where additional durability for the template, is deemed desirable, this part could be formed of metal, or a metal cover provided for the vinyl template, or the individual bores therein alone could be provided with metal inserts to reduce wear due to drilling therethrough.

The measurement scale on rod 13 may be in conventional or metric units or both. Normally rod 13 would be one yard or thirty-six inches in length but one meter or other lengths may also be employed, as so desired.

These and other variations and modifications of the present invention will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. An instrument for accurately measuring and positioning cabinet and furniture door hinges comprising:

an elongated measuring rod having a measurement scale thereon;

a door contact member transversely attached to an end of said measuring rod;

at least one sleeve member slidably disposed on said measuring rod;

means extending through a first side of said at least one sleeve member to selectively engage said measuring rod and releasably fix said sleeve member in position thereon;

a hinge template releasably connected to said sleeve member;

said hinge template including a base portion and an elongated tenon extending from said base portion;

an elongated mortise formed in a second side of said sleeve member opposite to said first side;

said mortise serving to receive said elongated tenon of said hinge template; and, means for releasably securing said elongated tenon within said elongated mortise of said sleeve member.

2. The instrument of claim 1 wherein said at least one sleeve member comprises a plurality of sleeve members and including an identical hinge template releasably retained within each of said plurality of sleeve members.

3. The instrument of claim 1 wherein said door contact member transversely attached to an end of said measuring rod is provided with a stepped longitudinal surface on the side thereof facing said elongated measuring rod.

4. The instrument of claim 3 wherein said door contact member is pivotally attached to said measuring rod and pivotally movable 180° from a first transverse position relative to said measuring rod to a second transversely position relative to said measuring rod.

5. The instrument of claim 4 including a spring loaded pin serving to releasably latch said door contact member to said measuring rod in both said first and said second positions.

6. The instrument of claim 1 wherein said at least one sleeve member is provided with a window to expose to view a segment of the measurement scale on said measurement rod and indicia markings on said window that align with the measurement indicia on said measurement scale.

7. The instrument of claim 1 wherein said elongated measuring rod, said door contact member, said at least one sleeve member and said hinge template are all formed of a metal selected from the group of metals consisting of steel, aluminum and alloys of steel and aluminum.

8. The instrument of claim 1 wherein said means extending through a first side of said sleeve member comprises a threaded thumbscrew extending through a threaded bore in said sleeve member, said thumbscrew having an end thereof adjacent said measuring rod and, when said thumbscrew is tightened, said end adjacent to said measuring rod frictionally engages said measuring rod to thereby releasably fix said sleeve in position on said measuring rod.

9. The instrument of claim 1 wherein said means extending through a first side of said sleeve member comprises a thumbscrew extending through said sleeve member and a nut for said thumbscrew, means on said measuring rod slidably receiving said nut and wherein, when said thumbscrew is tightened, said nut frictionally engages said means on said measuring rod to thereby releasably fix said sleeve in position on said measuring rod.

10. The instrument of claim 9 wherein said means on said measuring rod slidably receiving said nut is an open channel bar attached to and extending the length of said measuring rod and when said thumbscrew is tightened, said nut engages said channel bar and frictionally retains said sleeve in position.

11. The instrument of claim 1 wherein said means securing said elongated tenon within said elongated mortise of said at least one sleeve member includes a bore extending through the transverse length of said tenon, a matching transverse bore provided in the portion of said sleeve member containing said bore and a pin member positioned within said bores to secure said tenon within said mortise.

12. The instrument of claim 11 wherein a threaded area is provided within at least a portion of said bore in said sleeve member and said pin member is proved with a knurled head and a matching threaded section received within said bore.

13. The instrument of claim 11 including at least one sping urged detent disposed in said sleeve member and transversely extending into said bore, a circumferential groove provided on the portion of said pin member received within said bore and said at least one spring urged detent engaging said groove to releasably retain said pin within said bore.

14. An instrument for accurately measuring and positioning cabinet and furniture door hinges comprising:

an elongated measuring rod having a measurement scale thereon;

a door contact member transversely attached to an end of said measuring rod;

a pair of nonrotatable sleeves slidably disposed on said measuring rod;

means extending through a first side of each said sleeve and adapted to frictionally engage said measuring rod;

a pair of hinge templates, each one of said pair of hinge templates having an elongated base extending the length thereof and integral with a second side of one of said sleeves;

each said hinge template having bores therein corresponding to both the hinge section adapted to be attached to the cabinet door and the hinge section adapted to be attached to the cabinet frame, said door contact member being pivotally attached to said measuring rod and pivotally movable 180° from a first transverse position relative to said measuring rod to a second transverse position relative to said measuring rod.

15. The instrument of claim 14 wherein said door contact member includes a main body portion, a reduced thickness extension arm extending from one end of said main body portion and an end segment on the other end of said main body portion, said end segment forming an enlarged head of a pin member slidably extending transversely through a portion of said main body portion and serving to releasably lock said door contact member in said first and said second transverse positions.

16. The instrument of claim 15 including a spindle integrally formed on the end of said measuring rod and rotatably receiving said door contact member thereon, said spindle having a transverse bore therethrough and serving to receive said pin member when said door contact member is in said first and said second transverse positions.

17. A method of accurately measuring and positioning a set of door hinges on each door in a set of kitchen cabinets or the like comprising:

(a) providing an elongated measuring rod having a length at least equal to that of the doors to be hinged, said measuring rod having a measurement scale thereon and a transverse door contact member rotatably connected to one end thereof; said transverse door contact member having a reduced thickness arm extension on one end and an end segment forming the head of a transverse locking pin on the other end of said door contact member;

(b) positioning the reduced thickness arm extension of the transverse door contact member to rest against the top inside rabbet edge of the door;

(c) providing slidable sleeve members, equal in number to the hinges to be attached to the door and each having a hinge template base and a hinge template extending therefrom, onto the elongated measuring rod, each template having a pattern of holes therein corresponding to the pattern of holes in the hinge to be attached to the door;

(d) sliding the sleeve members along the elongated measuring rod to the desired position relative to the door to be hinged;

(e) releasably locking each sleeve member in the position selected and drilling a pattern of holes in the door through the pattern of holes in the hinge template; and, (f) while retaining the sleeve members in their releasably locked position, repeating steps a-e for each door in the set.

18. The method of Claim 18 including the steps of: retaining the sleeve members in the same releasably locked positions;

releasing the locking pin of the transverse door contact member;

rotating the transverse door contact member 180° and again employing the locking pin to lock the transverse door contact member in position;

positioning the transverse door contact member abutting the upper corner of a cabinet housing to which the doors are to be installed;

vertically aligning the measuring rod within the cabinet housing to cause the hinge template base to engage the cabinet housing; and drilling holes in the cabinet housing through the pattern of holes in the hinge template for installing a hinge to the cabinet housing.

19. The method of claim 17 wherein the hinge template and template base form an integral unit releasably secured to the sleeve and including the step of replacing this integral template unit to install hinges having a different screw pattern.

* * * * *